United States Patent
Kawaguchi et al.

(10) Patent No.: US 9,567,916 B2
(45) Date of Patent: Feb. 14, 2017

(54) ENGINE CONTROL APPARATUS AND CONSTRUCTION MACHINE

(71) Applicant: Komatsu Ltd., Tokyo (JP)

(72) Inventors: Tadashi Kawaguchi, Hiratsuka (JP); Kentaro Murakami, Chigasaki (JP)

(73) Assignee: Komatsu Ltd., Tokyo (JP)

( * ) Notice: Subject to any disclaimer, the term of this patent is extended or adjusted under 35 U.S.C. 154(b) by 244 days.

(21) Appl. No.: 13/993,879

(22) PCT Filed: Dec. 20, 2012

(86) PCT No.: PCT/JP2012/083162
§ 371 (c)(1),
(2) Date: May 2, 2014

(87) PCT Pub. No.: WO2014/080542
PCT Pub. Date: May 30, 2014

(65) Prior Publication Data
US 2014/0230785 A1 Aug. 21, 2014

(30) Foreign Application Priority Data
Nov. 20, 2012 (JP) ................. 2012-254738

(51) Int. Cl.
*E02F 9/22* (2006.01)
*E02F 9/20* (2006.01)
*F15B 11/08* (2006.01)
*B60W 10/06* (2006.01)
*F02D 11/06* (2006.01)
*F02D 29/04* (2006.01)
*B60P 1/16* (2006.01)

(52) U.S. Cl.
CPC .............. *F02D 11/06* (2013.01); *B60P 1/162* (2013.01); *E02F 9/2066* (2013.01); *F02D 29/04* (2013.01)

(58) Field of Classification Search
CPC .......... F02D 29/04; F02D 29/06; B60P 1/162; E02F 9/2066; E02F 9/22; E02F 9/2228; E02F 9/2246
(Continued)

(56) References Cited

U.S. PATENT DOCUMENTS 6,220,028 B1 * 4/2001 Ishikawa ............... E02F 9/2235
60/431
8,316,636 B2 11/2012 Nakamura
(Continued)

FOREIGN PATENT DOCUMENTS

CN 101861455 A 10/2010
JP 2005147040 A * 6/2005
(Continued)

OTHER PUBLICATIONS

International Search Report dated Jan. 22, 2013, issued for PCT/JP2012/083162.

*Primary Examiner* — Hai Huynh
*Assistant Examiner* — Raza Najmuddin
(74) *Attorney, Agent, or Firm* — Locke Lord LLP

(57) ABSTRACT

An engine control apparatus for controlling an engine which drives a hydraulic pump to discharge operation oil, the engine control apparatus includes: a pump driving power limit unit configured to limit pump driving power, which is power used to drive the hydraulic pump, based on pressure of the operation oil discharged by the hydraulic pump when in a state in which a part of the operation oil discharged by the hydraulic pump is released because pressure of the operation oil discharged by the hydraulic pump has become equal to or higher than preset relief pressure; and an engine output control unit configured to control output of the engine so that target speed, which is speed of the engine set as a
(Continued)

target, becomes equal to or higher than a value of a point of time when limiting of the pump driving power is started.

7 Claims, 6 Drawing Sheets

(58) Field of Classification Search
USPC .......................... 701/101–104, 110, 13, 113
See application file for complete search history.

(56) References Cited

U.S. PATENT DOCUMENTS

| | | | | |
|---|---|---|---|---|
| 2008/0245065 | A1* | 10/2008 | Nakamura | E02F 9/2235 60/426 |
| 2010/0186713 | A1* | 7/2010 | Kawaguchi | E02F 9/2075 123/350 |
| 2011/0167811 | A1* | 7/2011 | Kawaguchi | E02F 9/2246 60/395 |
| 2015/0144408 | A1* | 5/2015 | Ishihara | B60L 11/14 180/53.4 |
| 2015/0300378 | A1* | 10/2015 | Udagawa | E02F 3/32 60/449 |
| 2015/0337521 | A1* | 11/2015 | Sakamoto | B60K 6/485 180/65.26 |

FOREIGN PATENT DOCUMENTS

| | | |
|---|---|---|
| JP | 2007-321672 A | 12/2007 |
| JP | 2009-074407 A | 4/2009 |
| JP | 2012-137027 A | 7/2012 |
| JP | 2012-211596 A | 11/2012 |
| KR | 10-2009-0019826 A | 2/2009 |

* cited by examiner

ENGINE CONTROL APPARATUS AND CONSTRUCTION MACHINE

FIELD

The present invention relates to an engine control apparatus, which is used when a hydraulic pump is driven by an engine, and a construction machine.

BACKGROUND

A construction machine, such as an excavator, a bulldozer, a dump truck, or a wheel loader, is provided with a hydraulic pump, which is driven by an engine, in order to supply operation oil to a hydraulic actuator, which is used to actuate a working machine or a vessel. For example, Patent Literature 1 discloses control of lowering an engine speed, not limiting a pump absorption torque, when a hydraulic pump reaches a relief state in connection with driving a hydraulic pump by a diesel engine.

CITATION LIST

Patent Literature

Patent Literature 1: Japanese Laid-open Patent Publication No. 2009-74407

SUMMARY

Technical Problem

The technology disclosed in Patent Literature 1 is advantageous in that the engine efficiency is improved, without lowering the pump efficiency. However, there is a possibility in connection with the technology of Patent Literature 1 that, during high loading, such as during relief, a large change of the speed, which is chosen as a target by the engine with regard to the discharge pressure of the hydraulic pump, may cause hunting of the engine speed resulting from variation of the discharge pressure.

It is an object of the present invention to suppress hunting of the engine speed during high loading, such as during relief, when a hydraulic pump is driven by an engine.

Solution to Problem

According to the present invention, an engine control apparatus for controlling an engine which drives a hydraulic pump to discharge operation oil, the engine control apparatus comprises: a pump driving power limit unit configured to limit pump driving power, which is power used to drive the hydraulic pump, based on pressure of the operation oil discharged by the hydraulic pump when in a state in which a part of the operation oil discharged by the hydraulic pump is released because pressure of the operation oil discharged by the hydraulic pump has become equal to or higher than preset relief pressure; and an engine output control unit configured to control output of the engine so that target speed, which is speed of the engine set as a target, becomes equal to or higher than a value of a point of time when limiting of the pump driving power is started.

The pump driving power limit unit is configured to acquire a pump driving power limit value as a limit value of the pump driving power so that the pump driving power falls as pressure of the operation oil discharged by the hydraulic pump rises.

The engine output control unit is configured to acquire the target speed from an equal output line of output of the engine set as a target acquired based on the pump driving power limit value acquired by the pump driving power limit unit and from a matching line acquired based on fuel consumption efficiency of, the engine when the target speed increases above a maximum value after reaching the state in which a part of the operation oil discharged by the hydraulic pump is released.

According to the present invention, a construction machine comprises: an engine; a hydraulic pump driven by the engine; a relief valve configured to perform relief of operation oil when pressure of operation oil discharged by the hydraulic pump has become equal to or higher than preset relief pressure; a hydraulic actuator supplied with the operation oil discharged from the hydraulic pump; a working machine driven by the hydraulic actuator; and the engine control apparatus.

Advantageous Effects of Invention

The present invention can suppress hunting of the engine speed during high loading, such as during relief, when a hydraulic pump is driven by an engine.

DESCRIPTION OF EMBODIMENTS

A mode (embodiment) for carrying out the present invention will be described in detail with reference to the accompanying drawings.

Figure 1:
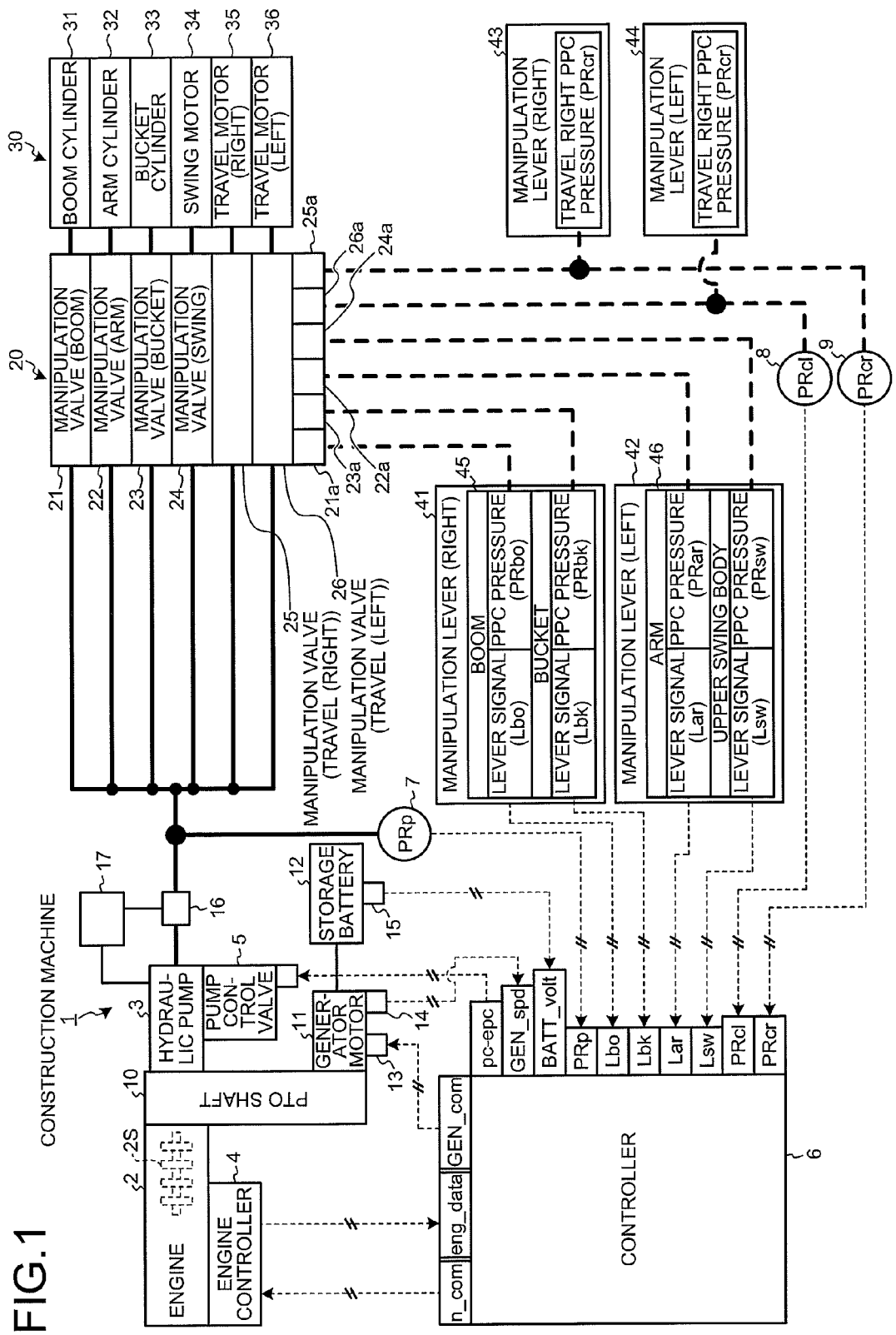
FIG. 1 is a block diagram illustrating an overall configuration of a construction machine 1 according to the present embodiment.

FIG. 1 is a block diagram illustrating an overall configuration of a construction machine 1 according to the present embodiment. Hereinafter, an excavator will be described as an example of the construction machine. According to the present embodiment, the construction machine 1 is not limited to the excavator as long as it has a hydraulic pump and an engine configured to drive the hydraulic pump.

<Construction Machine>

The construction machine 1 has an upper swing body and a lower travel body. The lower travel body has left and right crawler belts. The upper swing body has a working machine including a boom, an arm, and a bucket. The boom is operated by driving of a boom cylinder 31, the arm is operated by driving of an arm cylinder 32, and the bucket is operated by driving of a bucket cylinder 33. The left crawler belt and the right crawler belt are rotated by driving of a travel motor 36 and a travel motor 35, respectively. A swing machinery is driven by driving of a swing motor 34, and the upper swing body swings via a swing pinion and a swing circle, or the like.

An engine 2 is a diesel engine. The engine 2 has its output (horsepower, unit is kw) controlled by adjusting the amount of fuel injected into the cylinder (amount of fuel injection). The engine 2 is, for example, an engine capable of electronic control based on a common rail scheme. The amount of fuel into the engine 2 can be controlled properly, making it possible to freely set the torque that can be output with regard to an engine speed at a given instant.

As the engine control apparatus according to the present embodiment, a controller 6 outputs a rotation command value to an engine controller 4 so that the engine speed becomes a target speed n_com. The engine controller 4 increases/decreases the amount of fuel injection so that the target speed n_com is obtained at a target torque line. The engine controller 4 also outputs engine data eng_data including engine torque, which is estimated from the engine speed of the engine 2 and the amount of fuel injection, to the controller 6. Either the controller 6 or the engine controller 4 is a computer. As used in connection with the present embodiment, the speed of the engine 2 refers to the number of rotations of an output shaft 2S of the engine 2 per unit time, that is, the rate of rotation of the output shaft 2S.

The output shaft 2S of the engine 2 is connected to a driving shaft of a generator motor 11 via a PTO (Power Take Off) shaft 10. The generator motor 11 performs generating action and electromechanical action. In other words, the generator motor 11 either operates as a motor or operates as a generator. The generator motor 11 is directly connected to an output shaft of the engine 2. The generator motor 11 may be arranged between the engine 2 and an output shaft of a hydraulic pump 3 (described later).

The generator motor 11 has its torque controlled by an inverter 13. The inverter 13, as will be described later, controls the torque of the generator motor 11 according to a generator motor command value GEN_com output from the controller 6. The inverter 13 is electrically connected to a storage battery 12 via a DC power source line.

The storage battery 12 is a capacitor or a rechargeable battery, for example. The storage battery 12 accumulates (is charged with) power generated when the generator motor 11 has performed generating action. The storage battery 12 also supplies the inverter 13 with power stored therein. As used herein, the storage battery includes not only a capacitor that accumulates power as static electricity, but also a secondary cell such as a lead-acid battery, a nickel-metal hydride battery, or a lithium-ion battery. According to the present embodiment, the generator motor 11, the storage battery 12, and the inverter 13 are not indispensable.

A driving shaft of the hydraulic pump 3 is connected to the output shaft 2S of the engine 2 via the PTO shaft 10. The hydraulic pump 3 is driven by rotation of the output shaft 2S of the engine 2. According to the present embodiment, the hydraulic pump 3 is a variable displacement hydraulic pump, whose displacement q (cc/rev) changes as the tilting angle of its swash plate changes. A relief valve 16 is provided on the discharge port side of the hydraulic pump 3. The relief valve 16 releases a part of the operation oil, which has been discharged by the hydraulic pump 3, to an operation oil tank 17 when the pressure of the operation oil discharged by the hydraulic pump 3 becomes equal to or higher than a preset relief pressure PRr.

The operation oil, which has been discharged from the hydraulic pump 3' at a discharge pressure PRp and a flow rate Q (cc/min), is supplied to a boom manipulation valve 21, an arm manipulation valve 22, a bucket manipulation valve 23, a swing manipulation valve 24, a right travel manipulation valve 25, and a left travel manipulation valve 26, respectively. The discharge pressure PRp is detected by an oil pressure sensor 7. The oil pressure sensor 7 inputs an oil pressure detection signal, which corresponds to the discharge pressure PRp, to the controller 6. Hereinafter, the boom manipulation valve 21, the arm manipulation valve 22, the bucket manipulation valve 23, the swing manipulation valve 24, the right travel manipulation valve 25, and the left travel manipulation valve 26 will be referred to as manipulation valves 20 as a whole.

The operation oil output from the manipulation valves 21 to 26 is supplied to a boom cylinder 31, an arm cylinder 32, a bucket cylinder 33, a swing motor 34, a right travel-purpose travel motor 35, and a left travel-purpose travel motor 36, respectively. As a result of this process, the boom cylinder 31, the arm cylinder 32, the bucket cylinder 33, the swing motor 34, the travel motor 35, and the travel motor 36 are driven, respectively, and the boom, the arm, the bucket, the upper swing body, and the right and left crawler belts of the lower travel body are operated. Hereinafter, the boom cylinder 31, the arm cylinder 32, the bucket cylinder 33, the swing motor 34, the right travel-purpose travel motor 35, and the left travel-purpose travel motor 36 will be referred to as hydraulic actuators 30 as a whole. Furthermore, an electromechanically driven swing motor can substitute for the swing motor 34. An electrically driven swing motor is driven by power accumulated in the storage battery 12, and swings the upper swing body. Furthermore, the electrically driven swing motor can accumulate power in the storage battery 12 by regenerating swing energy of the upper swing body.

The construction machine 1 has, on the right and left sides of the front of its cab seat, a right manipulation lever 41, which is used to perform driving of the boom through manipulation in the forward/backward direction and to perform driving of the bucket through manipulation in the forward/backward direction, and a left manipulation lever 42, which is used to perform driving of the arm through manipulation in the forward/backward direction and to perform swing driving of the upper swing body through manipulation in the leftward/rightward direction, respectively. Furthermore, a right travel manipulation lever 43 and a left travel manipulation lever 44 are provided on the right and left sides of the front of the cab seat, respectively.

The controller 6 not only operates the boom and the bucket according to the direction of manipulation of the right work/swing manipulation lever 41, but also operates the boom and the bucket at a rate according to the amount of manipulation.

The manipulation lever 41 is provided with a pressure sensor 45 configured to detect the direction of manipulation and the amount of manipulation. The pressure sensor 45 detects a pilot oil pressure according to the direction of manipulation of the manipulation lever 41 and the amount of manipulation thereof and inputs an electric signal, which is output by itself, to the controller 6. When the manipulation lever 41 is manipulated in a direction for operating the boom, the pressure sensor 45 inputs a boom lever signal Lbo, which indicates the amount of boom lifting manipulation or the amount of boom lowering manipulation according to the tilting direction and tilting amount of the manipulation lever 41 with regard to the neutral position, to the controller 6. Furthermore, when the manipulation lever 41 is manipulated in a direction for operating the bucket, the pressure sensor 45 inputs a bucket lever signal Lbk, which indicates the amount of bucket digging manipulation or the amount of bucket dumping manipulation according to the tilting direction and tilting amount of the manipulation lever 41 with regard to the neutral position, to the controller 6.

When the manipulation lever 41 is manipulated in a direction for operating the boom, a pilot pressure (PPC pressure) PRbo according to the tilting amount of the manipulation lever 41 is applied to a pilot port 21a, which corresponds to the lever tilting direction (boom lifting direction or boom lowering direction), among respective pilot ports belonging to the boom manipulation valve 21.

Likewise, when the manipulation lever 41 is manipulated in a direction for operating the bucket, a pilot pressure (PPC pressure) PRbk according to the tilting amount of the manipulation lever 41 is applied to a pilot port 23a, which corresponds to the lever tilting direction (bucket digging direction or bucket dumping direction), among respective pilot ports belonging to the bucket manipulation valve 23.

The manipulation lever 42 is a manipulation lever for operating the arm and the upper swing body. The controller 6 not only operates the arm or the upper swing body according to the direction of manipulation of the manipulation lever 42, but also operates the arm or the upper swing body at a rate according to the amount of manipulation.

The manipulation lever 42 is provided with a pressure sensor 46 configured to detect the direction of manipulation and the amount of manipulation. The pressure sensor 46 detects a pilot oil pressure according to the direction of manipulation of the manipulation lever 42 and the amount of manipulation thereof and inputs an electric signal, which is output by itself, to the controller 6. When the manipulation lever 42 is manipulated in a direction for operating the arm, the pressure sensor 46 inputs an arm lever signal Lar, which indicates the amount of arm digging manipulation or the amount of arm dumping manipulation according to the tilting direction and tilting amount of the manipulation lever 42 with regard to the neutral position, to the controller 6. Furthermore, when the manipulation lever 42 is manipulated in a direction for operating the upper swing body, the pressure sensor 46 inputs a swing lever signal Lsw, which indicates the amount of right swing manipulation or the amount of left swing manipulation according to the tilting direction and tilting amount of the manipulation lever 42 with regard to the neutral position, to the controller 6.

When the manipulation lever 42 is manipulated in a direction for operating the arm, a pilot pressure (PPC pressure) PRar according to the tilting amount of the manipulation lever 42 is applied to a pilot port 22a, which corresponds to the lever tilting direction (arm digging direction or arm dumping direction), among respective pilot ports belonging to the arm manipulation valve 22.

Likewise, when the manipulation lever 42 is manipulated in a direction for operating the upper swing body, a pilot pressure (PPC pressure) PRsw according to the tilting amount of the manipulation lever 42 is applied to a pilot port 24a, which corresponds to the lever tilting direction (right swing direction or left swing direction), among respective pilot ports belonging to the swing manipulation valve 24.

The right travel manipulation lever 43 and the left travel manipulation lever 44 are manipulation levers for operating the right crawler belt and the left crawler belt, respectively, and not only operate the crawler belts according to the direction of manipulation, but also operate the crawler belts at a rate according to the amount of manipulation.

A pilot pressure (PPC pressure) PRcr according to the tilting amount of the manipulation lever 43 is applied to a pilot port 25a of the right travel manipulation valve 25. The pilot pressure PRcr is detected by an oil pressure sensor 9. The oil pressure sensor 9 inputs a signal, which corresponds to a right travel pilot pressure PRcr indicating the amount of right travel, to the controller 6. Likewise, a pilot pressure (PPC pressure) PRcl according to the tilting amount of the manipulation lever 44 is applied to a pilot port 26a of the left travel manipulation valve 26. The pilot pressure PRcl is detected by an oil pressure sensor 8. The oil pressure sensor 8 inputs a left travel pilot pressure PRcl, which indicates the amount of left travel, to the controller 6.

Each of the manipulation valves 21 to 26 is a flow rate direction control valve. Each of the manipulation valves 21 to 26 not only moves its own spool in a direction according to the direction of manipulation of the corresponding manipulation levers 41 to 44, but also moves the spool so that the oil passage is opened as much as the opening area according to the amount of manipulation of the manipulation levers 41 to 44.

A pump control valve 5 is operated by a control current pc-epc output from the controller 6, and changes the tilting angle of the swash plate belonging to the hydraulic pump 3 via a servo piston. The pump control valve 5 controls the tilting angle of the swash plate belonging to the hydraulic pump 3 so that the product of the discharge pressure PRp ($kg/cm^2$) of the hydraulic pump 3 and the displacement q (cc/rev) of the hydraulic pump 3 does not exceed pump absorption torque tpcom that corresponds to the control current pc-epc. This control is referred to as PC control.

The generator motor 11 is equipped with a rotation sensor 14 configured to detect the current actual speed GEN_spd (rpm) of the generator motor 11, that is, the actual speed GEN_spd of the engine 2. A signal indicating the actual speed GEN_spd detected by the rotation sensor 14 is input to the controller 6.

The storage battery 12 is provided with a voltage sensor 15 configured to detect a voltage BATT_volt of the storage battery 12. A signal indicating the voltage BATT_volt detected by the voltage sensor 15 is input to the controller 6.

The controller 6 outputs a generator motor command value GEN_com to the inverter 13 so that the generator motor 11 performs generating action or electromechanical action. When the controller 6 outputs a generator motor command value GEN_com for operating the generator motor 11 as a generator to the inverter 13, a part of output torque generated by the engine 2 is transmitted to the driving shaft of the generator motor 11 via the output shaft 2S. The generator motor 11 absorbs the torque of the engine 2 and generates electricity. The inverter 13 then converts the AC power generated by the generator motor 11 into DC power and accumulates the power in the storage battery 12 (charges it) via the DC power source line.

When the controller 6 outputs a generator motor command value GEN_com for operating the generator motor 11 as a motor to the inverter 13, the inverter 13 performs control so that the generator motor 11 operates as a motor. In other words, power is output (discharged) from the storage battery 12, and the DC power accumulated in the storage battery 12 is converted into AC power by the inverter 13 and supplied to the generator motor 11, thereby rotating the driving shaft of the generator motor 11. As a result, the generator motor 11 generates torque. This torque is transmitted to the output shaft 2S via the driving shaft of the generator motor 11 and is added to the output torque of the engine 2. In other words, the output of the engine 2 is assisted by the output of the generator motor 11. The hydraulic pump 3 absorbs the added output torque.

The amount of generation (amount of absorbed torque) by the generator motor 11 or the amount of electromagnetic action (amount of assist, that is, amount of generated torque) changes according to the content of the generator motor command value GEN_com. The controller 6 outputs a rotation command value to the engine controller 4, increases/decreases the amount of fuel injection so that the target speed is obtained according to the current load of the hydraulic pump 3, and thus adjusts the engine speed (equivalent to actual speed GEN_spd) ne of the engine 2 and the torque. Next, control of the engine 2 (engine control) according to the present embodiment will be described. The engine control according to the present embodiment is realized by the controller 6.

<Engine Control>

Figure 2:
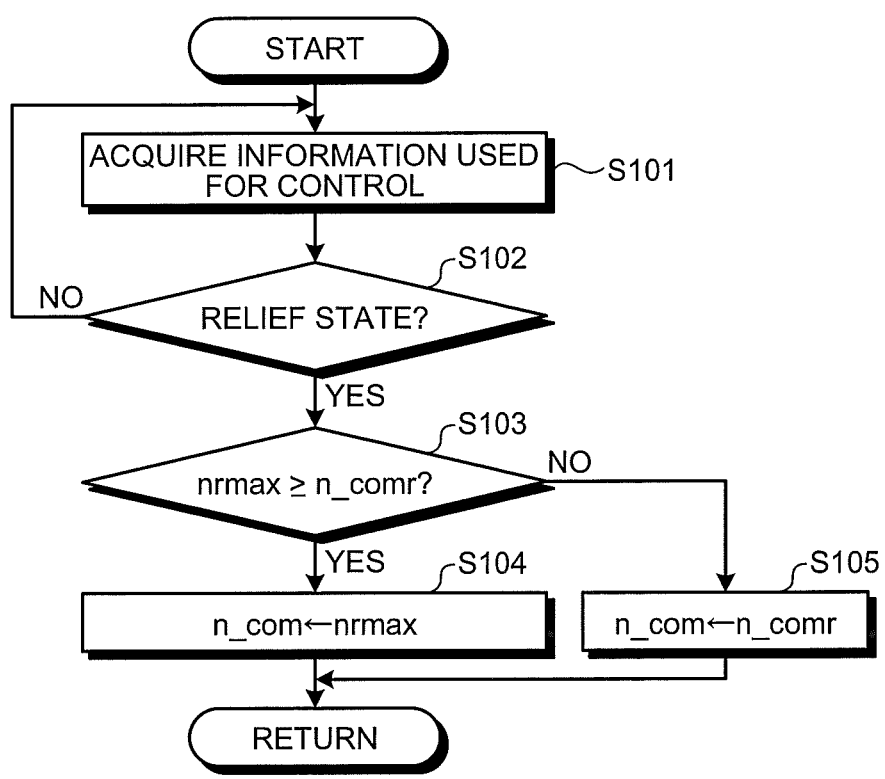
FIG. 2 is a flowchart illustrating an exemplary procedure of engine control according to the present embodiment.
Figure 3:
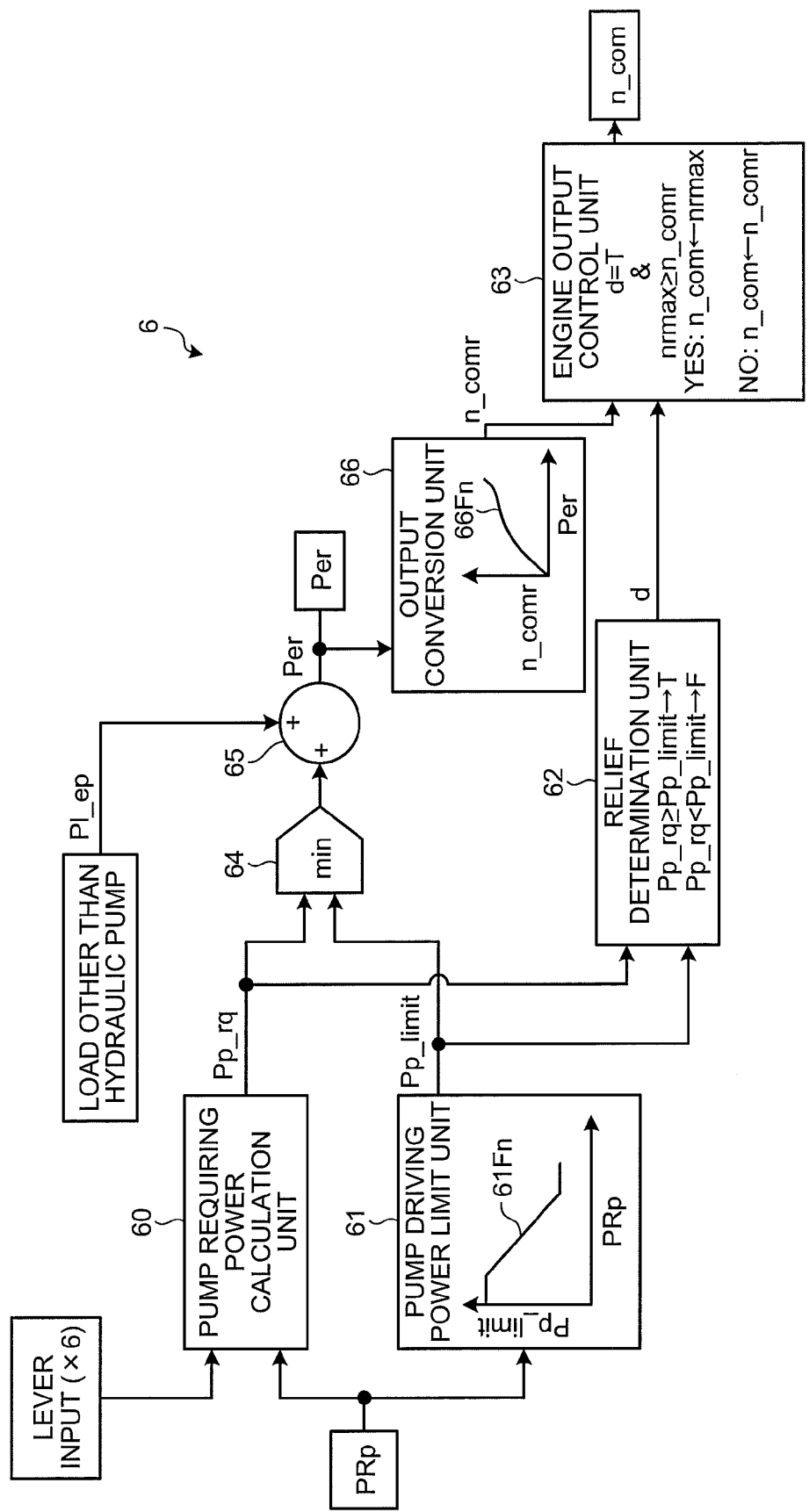
FIG. 3 is a control block diagram when a controller performs engine control according to the present embodiment.
Figure 4:
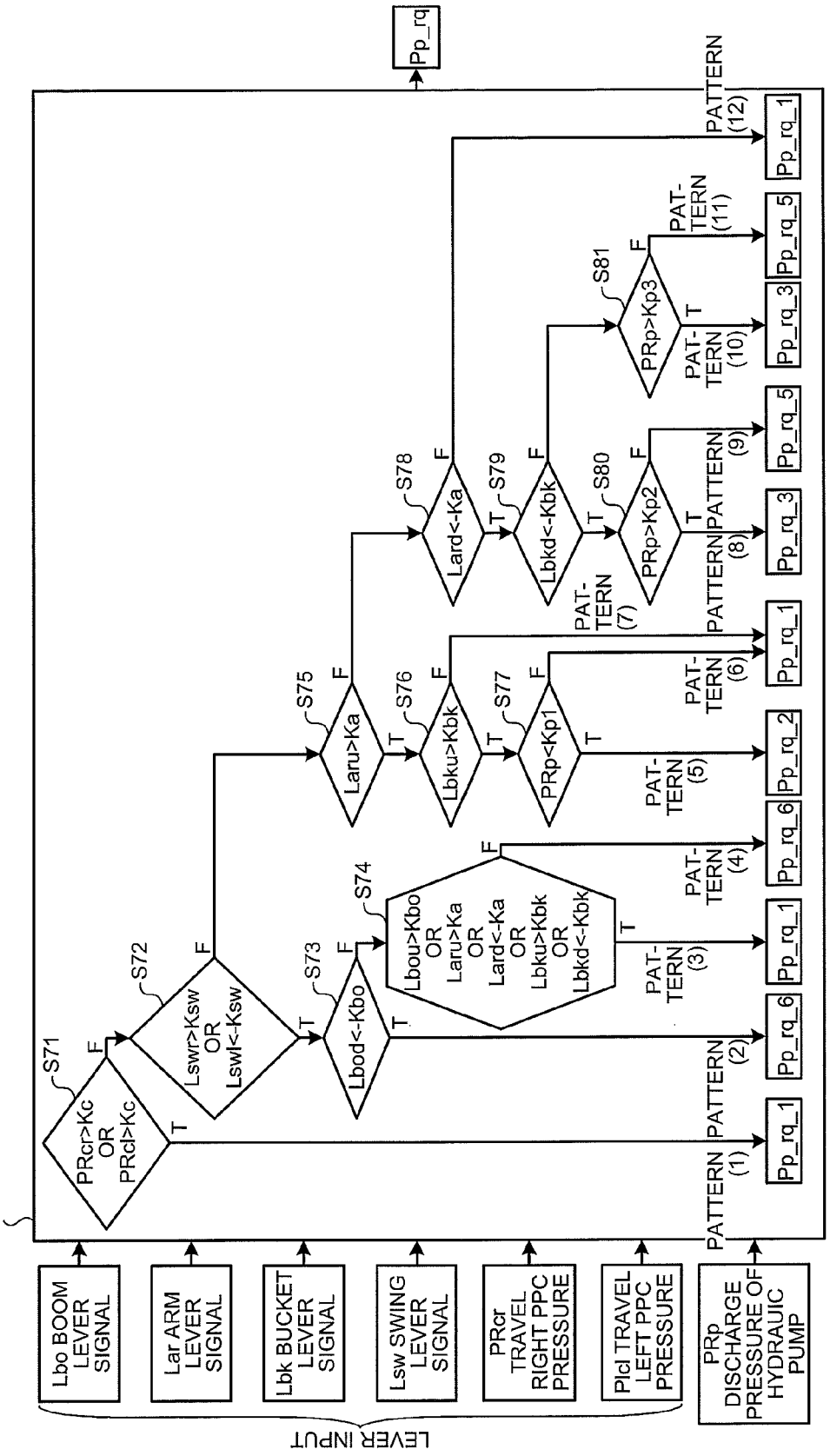
FIG. 4 is a diagram illustrating a processing flow of a pump requiring power calculation unit illustrated in FIG. 3.

FIG. 2 is a flowchart illustrating an exemplary procedure of engine control according to the present embodiment. FIG. 3 is a control block diagram when a controller performs engine control according to the present embodiment. FIG. 4 is a diagram illustrating a processing flow of a pump requiring power calculation unit illustrated in FIG. 3.

The engine control according to the present embodiment is performed in a relief state in which the pressure of the operation oil discharged by the hydraulic pump 3 illustrated in FIG. 1, that is, discharge pressure PRp, becomes equal to or higher than a preset relief pressure PRr so that the relief valve 16 releases a part of the operation oil discharged by the hydraulic pump 3 to the operation oil tank 17. The controller 6 configured to perform the engine control according to the present embodiment has a pump requiring power calculation unit 60, a pump driving power limit unit 61, a relief determination unit 62, an engine output control unit 63, a minimum selection unit 64, an addition unit 65, and an output conversion unit 66.

The controller 6, in line with performing engine control according to the present embodiment, acquires information used for control at step S101. The information used for control includes pump requiring power Pp_rq, which is power required to drive the hydraulic pump 3, pump driving power limit value Pp_limit as a limit value of pump driving power which is the power used to drive the hydraulic pump 3, and loads Pl_ep other than the hydraulic pump 3.

The pump requiring power Pp_rq is acquired by the pump requiring power calculation unit 60 illustrated in FIG. 3. The pump driving power limit value Pp_limit is acquired by the pump driving power limit unit 61. The loads Pl_ep include, for example, a load when driving a cooling fan used to cool the engine 2, a load when the engine 2 drives the generator motor 11 to make it perform generating action, and the like. Next, an exemplary procedure of acquiring the pump requiring power Pp_rq by the pump requiring power calculation unit 60 will be described. In the following description, determination result TRUE will be simply referred to as T, and determination result FALSE will be simply referred to as F.

The pump requiring power calculation unit 60 calculates power (horsepower) required to drive the hydraulic pump 3, that is, pump requiring power Pp_rq, according to a work pattern of the hydraulic actuators 30. At this time, the pump requiring power calculation unit 60 obtains a discharge pressure PRp of the hydraulic pump 3 from the oil pressure sensor 7 illustrated in FIG. 1 and obtains information regarding lever inputs of the manipulation levers 41 to 44.

The pump requiring power calculation unit 60 calculates in advance, as values of power required by the hydraulic pump 3, $Pp\_rq\_1$, $Pp\_rq\_2$, $Pp\_rq\_3$, $Pp\_rq\_4$, $Pp\_rq\_5$, $Pp\_rq\_6$. These values are set in the descending order of magnitude: $Pp\_rq\_1$, $Pp\_rq\_2$, $Pp\_rq\_3$, $Pp\_rq\_4$, $Pp\_rq\_5$, $Pp\_rq\_6$.

At step S71, when the right travel pilot pressure PRcr is larger than a predetermined pressure Kc or when the left travel pilot pressure PRcl is larger than the predetermined pressure Kc (T of step S71), the pump requiring power calculation unit 60 determines that the work pattern of the plurality of hydraulic actuators 30 is a work pattern (1) called "travel manipulation". The pump requiring power calculation unit 60 sets the pump requiring power Pp_rq of the hydraulic pump 3 to be $Pp\_rq\_1$ so as to conform to the work pattern called "travel manipulation".

Likewise, at respective steps S72 to S79, the following processing is performed: at step S72, based on whether the right swing manipulation amount Lswr is larger than a predetermined manipulation amount Ksw, it is determined whether the amount of rightward swing is larger than a predetermined value. Furthermore, at step S72, based on whether the left swing manipulation amount Lswl is smaller than a predetermined manipulation amount, Ksw, it is determined whether the amount of leftward swing is larger than a predetermined value.

At step S73, based on whether the boom lowering manipulation amount Lbod is smaller than a predetermined manipulation amount, Kbo, it is determined whether the amount of boom lowering manipulation is smaller than a predetermined value.

At step S74, based on whether the boom lifting manipulation amount Lbou is larger than a predetermined manipulation amount Kbo, it is determined whether the amount of boom lifting manipulation is larger than a predetermined value; based on whether the arm digging manipulation amount Laru is larger than a predetermined manipulation amount Ka, it is determined whether the amount of arm digging manipulation is larger than a predetermined value; and, based on whether the arm dumping manipulation amount Lad is smaller than a predetermined manipulation amount, Ka, it is determined whether the amount of arm dumping manipulation is larger than a predetermined value.

Furthermore, at step S74, based on whether the bucket digging manipulation amount Lbku is larger than a predetermined manipulation amount Kbk, it is determined whether the amount of bucket digging manipulation is larger than a predetermined value; or, based on whether the bucket dumping manipulation amount Lbkd is smaller than a predetermined manipulation amount, Kbk, it is determined whether the amount of bucket dumping manipulation is larger than a predetermined value.

At step S75, it is determined whether the arm digging manipulation amount Laru is larger than the predetermined manipulation amount Ka.

At step S76, it is determined whether the bucket digging manipulation amount Lbku is larger than the predetermined manipulation amount Kbk.

At step S77, it is determined whether the discharge pressure PRp of the hydraulic pump 3 is smaller than a predetermined pressure Kp1.

At step S78, it is determined whether the arm dumping manipulation amount Lad is smaller than the predetermined manipulation amount, Ka.

At step S79, it is determined whether the bucket dumping manipulation amount Lbkd is smaller than the predetermined manipulation amount, Kbk.

At step S80, it is determined whether the discharge pressure PRp of the hydraulic pump 3 is larger than a predetermined pressure Kp2.

At step S81, it is determined whether the discharge pressure PRp of the hydraulic pump 3 is larger than a predetermined pressure Kp3.

When the determination at step S71 is F, when the determination at step S72 is T, and when the determination at step S73 is T, the pump requiring power calculation unit 60 determines that the work pattern of the hydraulic actuators 30 is a work pattern (2) called "swing manipulation and boom lowering manipulation". The pump requiring power calculation unit 60 sets the pump requiring power Pp_rq of the hydraulic pump 3 to be Pp_rq$_{-6}$ so as conform to the work pattern called "swing manipulation and boom lowering manipulation".

When the determination at step S71 is F, when the determination at step S72 is T, when the determination at step S73 is F, and when the determination at step S74 is T, the pump requiring power calculation unit 60 determines that the work pattern of the hydraulic actuators 30 is a work pattern (3) called "swing manipulation and working machine manipulation other than boom lowering". The pump requiring power calculation unit 60 sets the pump requiring power Pp_rq of the hydraulic pump 3 to be Pp_rq$_{-1}$ so as to conform to the work pattern called "swing manipulation and working machine manipulation other than boom lowering".

When the determination at step S71 is F, when the determination at step S72 is T, when the determination at step S73 is F, and when the determination at step S74 is F, the pump requiring power calculation unit 60 determines that the work pattern of the hydraulic actuators 30 is a work pattern (4) called "single manipulation of swing manipulation". The pump requiring power calculation unit 60 sets the pump requiring power Pp_rq of the hydraulic pump 3 to be Pp_rq$_{-6}$ so as to conform to the work pattern called "single manipulation of swing manipulation".

When the determination at step S71 is F, when the determination at step S72 is F, when the determination at step S75 is T, when the determination at step S76 is T, and when the determination at step S77 is T, the pump requiring power calculation unit 60 determines that the work pattern of the hydraulic actuators 30 is a work pattern (5) called "slightly loaded by arm digging manipulation and bucket digging manipulation (for example, soil shoveling work)". The pump requiring power calculation unit 60 sets the pump requiring power Pp_rq of the hydraulic pump 3 to be Pp_rq$_{-2}$ so as to conform to the work pattern called "slightly loaded by arm digging manipulation and bucket digging manipulation".

When the determination at step S71 is F, when the determination at step S72 is F, when the determination at step S75 is T, when the determination at step S76 is T, and when the determination at step S77 is F, the pump requiring power calculation unit 60 determines that the work pattern of the hydraulic actuators 30 is a work pattern (6) called "heavily loaded by arm digging manipulation and bucket digging manipulation (for example, digging work by simultaneous manipulation of the arm and the bucket)". The pump requiring power calculation unit 60 sets the pump requiring power Pp_rq of the hydraulic pump 3 to be Pp_rq$_{-1}$ so as to conform to the work pattern called "heavily loaded by arm digging manipulation and bucket digging manipulation".

When the determination at step S71 is F, when the determination at step S72 is F, when the determination at step S75 is T, and when the determination at step S76 is F, the pump requiring power calculation unit 60 determines that the work pattern of the hydraulic actuators 30 is a work pattern (7) called "arm digging manipulation". The pump requiring power calculation unit 60 sets the pump requiring power Pp_rq of the hydraulic pump 3 to be Pp_rq$_{-1}$ so as to conform to the work pattern called "arm digging manipulation".

When the determination at step S71 is F, when the determination at step S72 is F, when the determination at step S75 is F, when the determination at step S78 is T, when the determination at step S79 is T, and when the determination at step S80 is T, the pump requiring power calculation unit 60 determines that the work pattern of the hydraulic actuators 30 is a work pattern (8) called "heavily loaded by arm earth removal manipulation and bucket earth removal manipulation (for example, soil pushing work by simultaneous earth removal manipulation of the arm and the bucket)". The pump requiring power calculation unit 60 sets the pump requiring power Pp_rq of the hydraulic pump 3 to be Pp_rq$_{-3}$ so as to conform to the work pattern called "heavily loaded by arm earth removal manipulation and bucket earth removal manipulation".

When the determination at step S71 is F, when the determination at step S72 is F, when the determination at step S75 is F, when the determination at step S78 is T, when the determination at step S79 is T, and when the determination at step S80 is F, the pump requiring power calculation unit 60 determines that the work pattern of the hydraulic actuators 30 is a work pattern (9) called "slightly loaded by arm earth removal manipulation and bucket earth removal manipulation (for example, work of simultaneously returning the arm and the bucket in the air)". The pump requiring power calculation unit 60 sets the pump requiring power Pp_rq of the hydraulic pump 3 to be Pp_rq$_{-5}$ so as to conform to the work pattern called "slightly loaded by arm earth removal manipulation and bucket earth removal manipulation".

When the determination at step S71 is F, when the determination at step S72 is F, when the determination at step S75 is F, when the determination at step S78 is T, when the determination at step S79 is F, and when the determination at step S81 is T, the pump requiring power calculation unit 60 determines that the work pattern of the hydraulic actuators 30 is a work pattern (10) called "heavily loaded by arm alone earth removal manipulation (for example, soil pushing work by arm earth removal work)". The pump requiring power calculation unit 60 sets the pump requiring power Pp_rq of the hydraulic pump 3 to be Pp_rq$_{-3}$ so as to conform to "heavily loaded by arm alone earth removal manipulation".

When the determination at step S71 is F, when the determination at step S72 is F, when the determination at step S75 is F, when the determination at step S78 is T, when the determination at step S79 is F, and when the determination at step S81 is F, the pump requiring power calculation unit 60 determines that the work pattern of the hydraulic actuators 30 is a work pattern (11) called "slightly loaded by arm alone earth removal manipulation (for example, work of returning the arm in the air)". The pump requiring power calculation unit 60 sets the pump requiring power Pp_rq of the hydraulic pump 3 to be Pp_rq$_{-5}$ so as to conform to the work pattern called "slightly loaded by arm alone earth removal manipulation".

When the determination at step S71 is F, when the determination at step S72 is F, when the determination at step S75 is F, and when the determination at step S78 is F, the pump requiring power calculation unit 60 determines that the work pattern of the hydraulic actuators 30 is a work pattern (12) called "other work". The pump requiring power calculation unit 60 sets the pump requiring power Pp_rq of the hydraulic pump 3 to be Pp_rq$_{-1}$ so as to conform to the work pattern called "other work".

Next, a procedure of acquiring a pump driving power limit value Pp_limit by the pump driving power limit unit 61 will be described. The pump driving power limit unit 61 obtains a discharge pressure PRp of the hydraulic pump 3 from the oil pressure sensor 7 illustrated in FIG. 1. The pump driving power limit unit 61 then acquires a pump driving power limit value Pp_limit of the hydraulic pump 3 with regard to the obtained discharge pressure PRp of the hydraulic pump 3. The pump driving power limit value Pp_limit is determined so that, during relief, that is, when the relief valve 16 releases a part of the operation oil discharged from the hydraulic pump 3, any abrupt variation of power used to drive the hydraulic pump 3 is suppressed. According to the present embodiment, the pump driving power limit value Pp_limit is acquired based on a function 61Fn regarding the discharge pressure PRp.

According to the present embodiment, the pump driving power limit value Pp_limit is set so that the power used to drive the hydraulic pump 3 decreases as the discharge pressure PRp, that is, the pressure of the operation oil discharged from the hydraulic pump 3, rises. More specifically, in a first range where the discharge pressure PRp is small to some extent, the pump driving power limit value Pp_limit is constant regardless of the magnitude of the discharge pressure PRp. When the discharge pressure PRp exceeds the first range and enters into a second range, the pump driving power limit value Pp_limit decreases as the discharge pressure PRp rises. When the discharge pressure PRp then exceeds the second range and enters into a third range, the pump driving power limit value Pp_limit becomes constant regardless of the magnitude of the discharge pressure PRp. The function 61Fn is set so as to realize such a relationship between the pump driving power limit value Pp_limit and the discharge pressure PRp and is memorized in the memorization device of the controller 6.

Having acquired information used for engine control at step S101, the controller 6 proceeds to step S102 for further processing. At step S102, the controller 6 determines whether the hydraulic pump 3 is in a relief state. This determination is made by the relief determination unit 62 illustrated in FIG. 3. Specifically, the relief determination unit 62 makes a determination of T (relief state) when the pump requiring power Pp_rq is equal to or higher than the pump driving power limit value Pp_limit and makes a determination of F (no relief state) when the pump requiring power Pp_rq is smaller than the pump driving power limit value Pp_limit. The relief determination unit 62 outputs a determination result flag d. The relief state can also be determined using the pump discharge pressure PRp based on a set relief pressure.

In the case of no relief state (step S102, No), that is, when the relief determination unit 62 has output F as the determination result flag d, the controller 6 repeats step S101 and step S102. In the case of no relief state, the engine controller 4 controls the engine 2 using a during-relief target speed n_comr of the engine 2, which is obtained from an output Per of the engine 2 set as a target described later, as a target speed n_com.

In the case of a relief state (step S102, Yes), that is, when the relief determination unit 62 has output T as the determination result flag d, the controller 6 proceeds to step S103 for further processing. At step S103, the engine output control unit 63 illustrated in FIG. 3 compares the speed (during-relief target speed) n_comr of the engine 2, which is obtained from the output (engine target output) Per of the engine 2 set as a target, with the maximum value of the during-relief target speed (during-relief maximum target speed) nrmax. The during-relief maximum target speed nrmax is the maximum value of the during-relief target speed n_comr between when the hydraulic pump 3 has entered into a relief state and when a determination is made at step S103. Also, according to the present embodiment, the initial value of the during-relief maximum target speed nrmax is zero. The during-relief target speed n_comr is a speed set as a target by the engine 2 during relief, which is determined based on the engine target output Per. The during-relief target speed n_comr is acquired by the engine output control unit 63. Next, an exemplary procedure of acquiring the during-relief target speed n_comr will be described.

In connection with acquiring the during-relief target speed n_comr, the minimum selection unit 64 of the controller 6 illustrated in FIG. 3 outputs a smaller one between the pump requiring power Pp_rq acquired by the pump requiring power calculation unit 60 and the pump driving power limit value Pp_limit acquired by the pump driving power limit unit 61 to the addition unit 65 of the controller 6. The addition unit 65 adds the output of the minimum selection unit 64 and the loads Pl_ep of the engine 2, which are associated with driving of auxiliary machines such as the fan and the generator motor 11 other than the hydraulic pump 3, and outputs the result of addition as the engine target output Per.

The output conversion unit 66 of the controller 6 obtains the engine target output Per output from the addition unit 65 and converts it into a during-relief target speed n_comr using a table 66Fn. The table 66Fn shows the relationship between the during-relief target speed n_comr and the engine target output Per, and is determined based on the specifications and characteristics of the engine 2. The table 66Fn is memorized in the memorization device of the controller 6.

The engine output control unit 63 compares the during-relief target speed n_comr acquired in this manner with the during-relief maximum target Speed nrmax and, when the during-relief maximum target speed nrmax is equal to or higher than the during-relief target speed n_comr (step S103, Yes), proceeds to S104 for further processing. Furthermore, when the during-relief maximum target speed nrmax is smaller than the during-relief target speed n_comr (step S103, No), the engine output control unit 63 proceeds to step S105 for further processing.

At step S104, the engine output control unit 63 sets the during-relief maximum target speed nramx as the target speed n_com. In other words, the target speed n_com is not updated to the during-relief target speed n_comr acquired from the engine target output Per. At step S105, the engine output control unit 63 sets the during-relief target speed n_comr, which is acquired from the engine target output Per, as the target speed n_com. In other words, the target speed n_com is updated to the during-relief target speed n_comr acquired from the engine target output Per.

The controller 6 outputs the during-relief target speed n_comr, which has been output from the engine output control unit 63, as the target speed n_com to the engine controller 4 illustrated in FIG. 1. The engine controller 4 controls the output of the engine 2, more specifically the torque, so that the engine target output Per output from the addition unit 65 is obtained at the target speed n_com. Execution of steps S101 to S105 realizes the engine control according to the present embodiment. Having finished the series of processing of the engine control according to the present embodiment, the controller 6 returns to START and repeats the processing from step S101. Next, changes of the speed of the engine 2, when the engine control according to the present embodiment has been performed, will be described.

Figure 5:
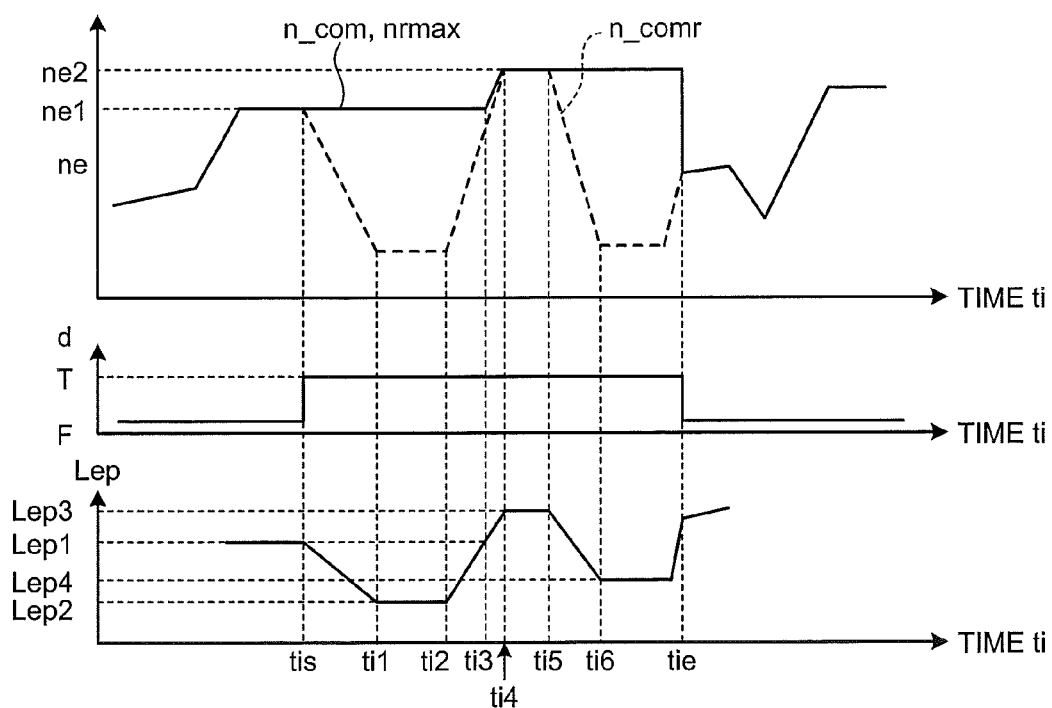
FIG. 5 is a diagram illustrating an exemplary time change of the engine speed when engine control according to the present embodiment is performed.
Figure 6:
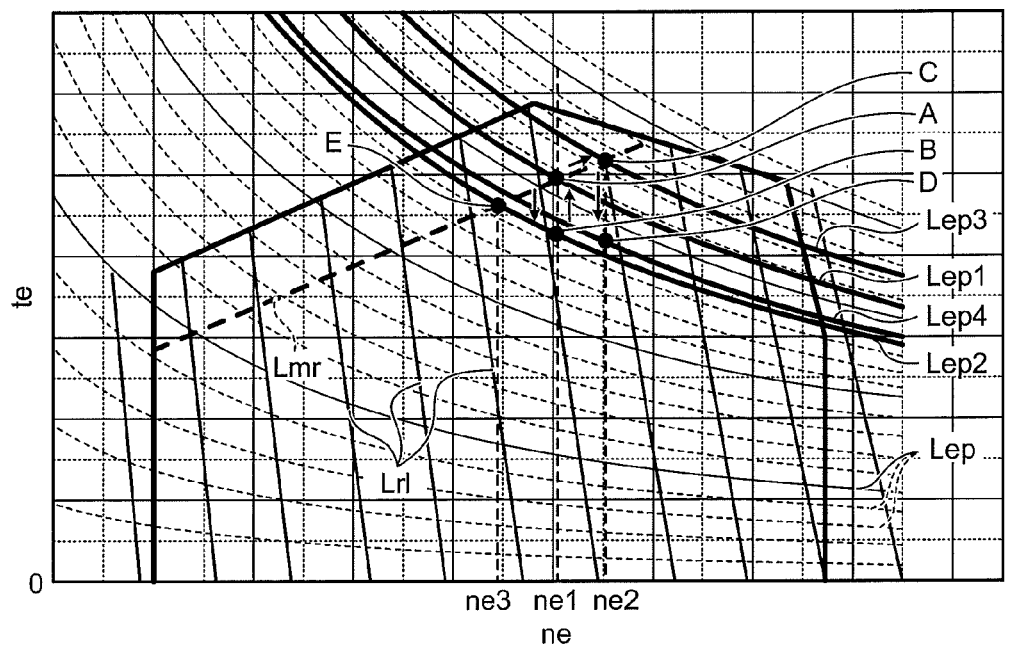
FIG. 6 is a diagram illustrating an exemplary relationship between the engine speed and the torque.
Figure 7:
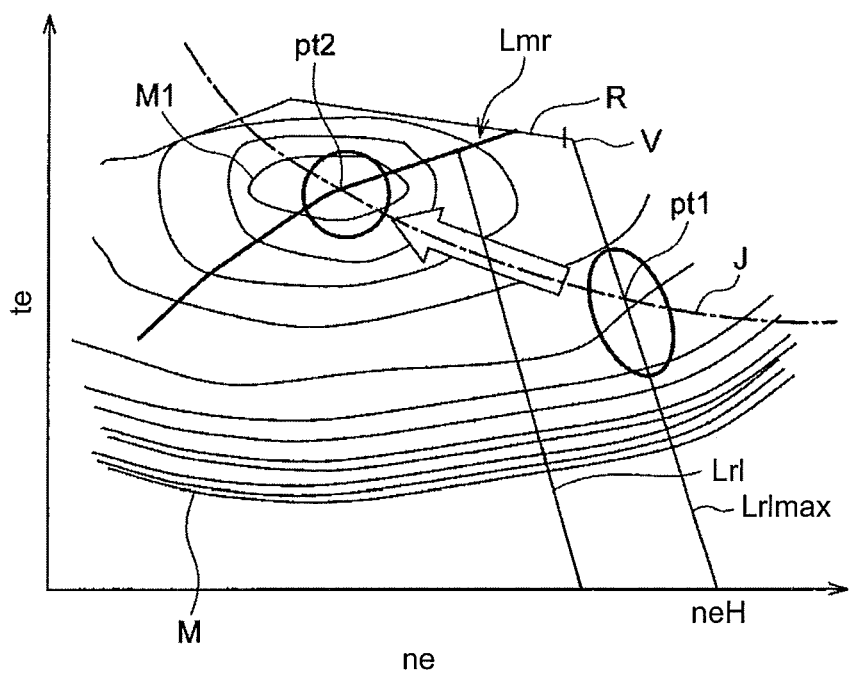
FIG. 7 is a torque line diagram.

FIG. 5 is a diagram illustrating an exemplary time change of the engine speed when engine control according to the present embodiment is performed. FIG. 6 is a diagram illustrating an exemplary relationship between the engine speed and the torque. FIG. 7 is a torque line diagram. In FIG. 6, Lep, Lep1, Lep2, and Lep3 are equal output (horsepower) lines, Lmr is a matching line, and Lrl is a regulation line. The Lep1 to Lep4 in FIG. 5 correspond to the equal output (horsepower) lines Lep1 to Lep4 illustrated in FIG. 6.

By performing the engine control according to the present embodiment, the target speed n_com of the engine 2 is controlled, during relief of the hydraulic pump 3, by the engine output control unit 63 of the controller 6 so as to become equal to or higher than a value at a point of time when limiting of the pump driving power is started, that is, when relief is started.

FIG. 5 illustrates changes of the during-relief maximum target speed nrmax, the target speed n_com, and the during-relief target speed n_comr, as time ti passes, during relief of the hydraulic pump 3. As illustrated, the relief valve 16 illustrated in FIG. 1 starts relief at time tis, and the relief ends at time tie. During relief, the determination result flag d output by the relief determination unit 62 illustrated in FIG. 3 changes from F to T, and, during other than relief, the determination result flag d becomes F.

As illustrated in FIG. 5, when the engine control according to the present embodiment is performed, the during-relief maximum target speed nrmax and the target speed n_com become equal, during other than relief, and the engine speed ne changes following the target speed n_com. When relief is started at time tis, in the example illustrated in FIG. 5, the during-relief target speed n comr falls as time ti passes. At time tis, the engine 2 is run at an output corresponding to the equal output line Lep1. When time tis is over, the output of the engine 2 becomes lower than the output corresponding to the equal output line Lep1.

The engine output control unit 63 illustrated in FIG. 3 considers the during-relief maximum target speed nrmax as the target speed n_com when nrmax≥n_comr. Due to this, the target speed n_com is maintained at a value of the during-relief maximum target speed nrmax, which is the maximum value from time tis, that is, relief start time. Also, according to the present embodiment, the initial value of the during-relief maximum target speed nrmax is zero, so that the during-relief maximum target speed nrmax at time tis, that is, relief start time, is zero. Therefore, nrmax<n_comr at the relief start time, and, as a result, the target speed n_com at the relief start time is updated to the during-relief target speed n_comr (in this example, speed ne1). This target speed n_com becomes the during-relief maximum target speed nrmax during the interval from the initial update of the target speed n_com to its next update.

The reason that the during-relief target speed n_comr changes during relief is as follows: the during-relief target speed n_comr is determined based on the engine target output Per, but the engine target output Per varies as the load of auxiliary machinery of the engine 2 varies.

Since the during-relief target speed n_comr keeps falling until time ti1, the target speed n_com remains constant until time ti1 passes from the relief start. After time ti1, the engine 2 is run at an output corresponding to the equal output line Lep2. The during-relief target speed n_comr turns to rising at time ti2, but, when nrmax≥n_comr, the engine output control unit 63 uses the during-relief maximum target speed nrmax as the target speed n_com. Due to this, the target speed n_com is maintained at the during-relief maximum target speed nrmax until time ti3 when the during-relief target speed n_comr becomes equal to the during-relief maximum target speed nrmax.

After time ti2, the during-relief target speed n_comr rises as time ti passes and, after time ti3, becomes nrmax<n_comr. In this case, the engine output control unit 63 updates the target speed n_com to the during-relief target speed n_comr. Therefore, after time ti3, the engine output control unit 63 always updates the target speed n_com to the during-relief target speed n_comr. Due to this, the during-relief maximum target speed nrmax rises as time ti passes. When time ti2 is over, the output of the engine 2 rises to an output higher than an output corresponding to the equal output line Lep2 and becomes an output corresponding to the equal output line Lep3 at time ti4.

In the example illustrated in FIG. 5, after time ti4, the during-relief target speed n_comr remains the same value as at time ti4 and then turns to falling at time ti5. Then, the during-relief target speed n_comr stops falling at time ti6 and becomes a constant value. From time ti5 to time ti6, the output of the engine 2 changes to an output lower than the output corresponding to the equal output line Lep3. Then, at time ti6, it becomes an output corresponding to the equal output line Lep4.

Thereafter, the during-relief target speed n_comr does not exceed the value of the during-relief maximum target speed nrmax (value at time ti4) until the time tie when the relief ends. Therefore, during the interval from time ti4 to tie, the target speed n_com is maintained at the value of the during-relief maximum target speed nrmax (in this example, speed ne2) at time ti4. As the engine output control unit 63 performs the engine control according to the present embodiment in this manner, the engine speed ne during a relief period is controlled so that the target speed n_com becomes equal to or higher than the speed of the engine 2 at the point of time when relief is started, that is, target speed n_com at time tis.

During the interval from time tis to ti3 and during the interval from time ti5 to time tie, illustrated in FIG. 5, the during-relief target speed n_comr becomes lower than the engine speed ne at time tis, that is, relief start time. Due to this, the output of the engine 2 during the interval from time tis to ti3 becomes smaller than the output of the engine 2 at time tis, that is, relief start time. Furthermore, the output of the engine 2 during the interval from time ti5 to time tie becomes smaller than the output of the engine 2 at time ti5. Therefore, the engine output control unit 63 lowers the torque of the engine 2, during the interval from time tis to ti3 and during the interval from time ti5 to time tie, thereby lowering the output of the engine 2 while maintaining the engine speed ne at the value of the relief start time or the value of time ti5.

The matching line Lmr illustrated in FIG. 6 is set so that the engine speed ne increases as the load (corresponding to torque to of the ordinate axis of FIG. 6) of the hydraulic pump 3 illustrated in FIG. 1 increases, and so that the matching line Lmr extends through an area adjacent to a fuel consumption minimum point, at which the fuel consumption ratio becomes smallest with regard to the output of the engine 2 at that time, preferably extends through the fuel consumption minimum point. Furthermore, the more separated from the fuel consumption minimum point, the larger the fuel consumption ratio becomes, so that the matching line Lmr is set in a range as little separated from the fuel consumption minimum point as possible. By running the engine 2 in conformity with the matching line Lmr and driving the hydraulic pump 3, use in an area where the efficiency of the hydraulic pump 3 is high is made possible, and the amount of fuel consumed by the engine 2 can be suppressed. The regulation line Lrl is set based on a matching point. Also, the fuel consumption ratio (hereinafter, simply referred to as fuel consumption) refers to the amount of fuel consumed by the engine 2 per one hour and an output of 1 kW, which is an index of the efficiency of the engine 2.

Next, the matching line Lmr will be described in more detail with reference to FIG. 7. FIG. 7 is a torque line diagram of the engine 2, where the abscissa axis denotes the engine speed ne (rpm: rev/min) and the ordinate axis denotes the torque te (N×m). In FIG. 7, the area specified by the maximum torque line R indicates performance the engine 2 can generate. The engine controller 4, which has the function of a governor, controls the engine 2 so that the torque te is prevented from exceeding the maximum torque line R and reaching the exhaust gas limit, and so that the engine speed ne is prevented from exceeding the high idle speed neH and reaching over-speeding. The output (horsepower) P of the engine 2 becomes the maximum at a rated point V on the maximum torque line R. J refers to an equal output curve where the torque absorbed by the hydraulic pump 3 becomes equal.

When the maximum target speed of the engine 2 is set, the controller 4 performs speed regulation along the highest speed regulation line Lrlmax, which joins the rated point V and the high idle point neH.

As the load of the hydraulic pump 3 becomes larger, the matching point, at which the output of the engine 2 and the pump absorption torque match each other, moves on the highest speed regulation line Lrlmax towards the rated point V. When the matching point moves towards the rated point V, the engine speed ne gradually falls, and, at the rated point V, the engine speed ne becomes a rated speed.

When a work is performed while fixing the engine speed ne at an approximately constant speed in this manner, there is a problem in that the fuel consumption is large (bad), and thus the pump efficiency is low. The pump efficiency refers to efficiency of the hydraulic pump 3 specified by volumetric efficiency and torque efficiency.

In FIG. 7, M refers to equal fuel consumption curves. The fuel consumption becomes the minimum at M1, which is the trough of the equal fuel consumption curves M. M1 is referred to as a fuel consumption minimum point. The fuel consumption becomes larger, that is, worse, farther from the fuel consumption minimum point M1 towards the outside.

As is obvious from FIG. 7, the regulation line Lrl corresponds to an area where fuel consumption is relative large on the equal fuel consumption curve M. Due to this, according to the conventional control method, fuel consumption is large (bad), which is not desirable in terms of engine efficiency.

Meanwhile, it is generally known that, in the case of a variable displacement hydraulic pump 3, given the same discharge pressure PRp, the larger the displacement q (swash plate tilting angle) is, the higher the volumetric efficiency and torque efficiency, meaning higher pump efficiency.

As is also obvious from Equation (1) below, when the flow rate Q of a pressure oil discharged from the hydraulic pump 3 is the same, the lower the engine speed ne is made, the larger the displacement q can become. This makes it possible to improve the pump efficiency by lowering the speed of the engine 2.

$$Q=ne \times q \qquad (1)$$

Therefore, in order to improve the pump efficiency of the hydraulic pump 3, the engine 2 needs to be operated in a low-speed area where the engine speed ne is low.

The matching line Lmr is a line indicating a relationship between the engine speed ne and the torque te, which is acquired based on fuel consumption efficiency of the engine 2. Specifically, the matching line Lmr is a line indicating a relationship between the engine speed ne and the torque te, which is set so as to extend through the fuel consumption minimum point M1. The matching line Lmr preferably extends through the fuel consumption minimum point M1, but various restrictions make it not always possible to set the line so as to extend through the fuel consumption minimum point M1. Due to this, the matching line Lmr is set so as to extend near the fuel consumption minimum point M1 when it is difficult to set the line so as to extend through the fuel consumption minimum point M1. In this case, the matching line Lmr is set so as to extend as close to the fuel consumption minimum point M1 as possible. The expression "as close to the fuel consumption minimum point M1 as possible", as used herein, can be regarded as indicating a range surrounded by an equal fuel consumption curve M, in which the fuel consumption ratio corresponds to about 105 to 110% of that at the fuel consumption minimum point M1, for example.

As described above, farther from the fuel consumption minimum point M1 an equal fuel consumption curve M is, the larger, that is, worse fuel consumption becomes, so that the matching line Lmr is set to be as little separated from the fuel consumption minimum point M1 outwards as possible. Furthermore, in the process of being separated from the fuel consumption minimum point M1 outwards, the larger the number of equal fuel consumption curves M intersecting with the matching line Lmr is, the higher is the possibility that the engine 2 may be run in an area of large fuel consumption. Therefore, the matching line Lmr is, in the process of being separated from the fuel consumption minimum point M1 outwards, set so as to minimize the number of equal fuel consumption curves M intersecting with the matching line Lmr.

When the engine speed ne is controlled along the matching line Lmr acquired in this manner, the fuel consumption, the engine efficiency, and the pump efficiency are improved. This is because, under the condition that the engine 2 is made to output the same horsepower to obtain the same required flow rate from the hydraulic pump 3, it is not when matching is done on a point pt1 on the regulation line Lrl (in this example, the highest speed regulation line Lrlmax), but when matching is done on a point pt2 on the matching line Lmr, which is a point on the same equal output line J, that the state of the engine 2 shifts from high speed and low torque to low speed and high torque, thereby increasing the pump displacement q and making the engine 2 run at a point close to the fuel consumption minimum point M1 on the equal fuel consumption curve M. Furthermore, the fact that the engine 2 is operated in a low-speed area decreases noise and reduces engine friction, pump unload loss, and the like.

It is assumed that, before relief is started, the engine 2 is run under a condition of position A illustrated in FIG. 6. When the engine control according to the present embodiment is performed, the output of the engine 2 has a value during an interval from time tis, when relief has been started, to time ti3, which has become smaller than the value at time tis when relief has been started. In other words, a shift occurs from position A to position B illustrated in FIG. 6, and the engine 2 is run in conformity with an equal output line (for example, Lep2 during time ti1-time ti2) of an output smaller than the equal output line Lep1.

The engine speed ne at time tis (refer to FIG. 5), when relief is started, is speed ne1, and, when the engine 2 is run in conformity with the equal output line Lep2, as described above, at time ti1, the engine speed ne is maintained at speed ne1 of time tis. Therefore, the engine 2 is run under the condition of position B, in which the equal output line Lep2 and the engine speed net intersect. Thereafter, as the output of the engine 2 increases during an interval from time ti2 to time ti3, a shift occurs from the equal output line Lep2 to Lep1 while maintaining the engine speed ne1. This corresponds to the shift from position B to position A in FIG. 6. What occurs after time ti3 will be described next. As illustrated in FIG. 5, the target speed n_com and the output of the engine 2 rise after time ti3, and the engine 2 is run in conformity with the equal output line Lep3 during an interval from time ti4 to time ti5. In this case, the engine speed ne has only to be on the equal output line Lep3 and equal to or higher than ne1.

According to the present embodiment, the engine 2 is, from position A of FIG. 6, run at speed ne2 of position C, which is a point of intersection between the equal output line Lep3 and the matching line Lmr. This makes it possible to suppress fuel consumption of the engine 2 and to run the hydraulic pump 3 under a condition of good efficiency. Furthermore, the fact that the engine speed ne is determined in conformity with the equal output line Lep3 guarantees that, even if the engine speed ne is varied, any change of operation speed of the working machine belonging to the construction machine 1 illustrated in FIG. 1 is suppressed. It is also possible to suppress hunting of the engine speed ne during relief without adjusting the function 61Fn, or the like, held by the pump driving power limit unit 61, thereby decreasing the possibility that discomfort may be inflicted on the manipulation feeling, and the like of the operator of the construction machine 1.

As illustrated in FIG. 5, during an interval from time ti5 to time tie, the during-relief target speed n_comr falls, but the target speed n_com reaches a value of time ti5. During an interval from time ti5 to time tie, the engine speed ne maintains the value of speed ne2. Therefore, the running condition of the engine 2 changes, since the speed ne2 is maintained, from the running condition of position C in FIG. 6, which is a point of intersection between the speed ne2 and the equal output line Lep3, to the running condition of position D in FIG. 6, which is a point of intersection between the speed ne2 and the equal output line Lep4. According to this change, the engine 2 is run under the running condition of position D. The period of time for which the engine 2 is run under the running condition of position D is a period of time spanning from time ti6 to timing, before time tie, at which the output of the engine 2 turns to increasing. The equal output line Lep4 indicates an engine target output Per corresponding to the during-relief target speed n_comr during an interval from time ti5 to time tie. Also, the output corresponding to the equal output line Lep4 is smaller than the output corresponding to the equal output line Lep3.

The engine control according to the present embodiment does not update the target speed n_com to the during-relief target speed n_comr as long as the during-relief target speed n_comr does not become equal to or higher than the during-relief maximum target speed nrmax during relief. Therefore, in the example illustrated in FIG. 5, the engine speed ne after time ti5 is maintained at speed ne2. However, without being limited to such control, the engine output control unit 63 may make the engine speed ne smaller than ne2. In this case, for example, the engine output control unit 63 may run the engine 2 at engine speed ne=net (<ne2) of the point of time when relief is started (time tis). This makes it possible to run the engine 2 under a condition closer to the matching line Lmr and thus to suppress both degradation of efficiency of the hydraulic pump 3 and fuel consumption of the engine 2.

It is also possible to consider control which, during relief, lowers the engine speed ne along the matching line Lmr (for example, speed ne3 of position E in FIG. 6). Such control, if performed, has a possibility that, in the case of a large change of the target speed n_com with regard to the discharge pressure PRp of the hydraulic pump 3, any variation of the discharge pressure PRp may cause repetition of the situation of (a) and (b) given below and result in hunting of the engine speed ne.

(a) The target speed n_com varies as the discharge pressure PRp varies.

(b) Since the actual engine speed ne varies as the target speed n_com varies, the flow rate of the operation oil discharged from the hydraulic pump 3 varies, and the discharge pressure PRp varies.

For example, during relief, by performing boom lifting together with bucket relief, the flow rate of the operation oil flowing through the relief valve 16 illustrated in FIG. 1 changes. Due to this, the discharge pressure PRp varies. Furthermore, as the discharge pressure PRp varies, the operation oil is released from the relief valve 16 and then stopped, in a repeated manner. This results in a change of the engine target output Per, and thus a change of speed set as a target by the engine 2, which is determined from the matching line Lmr and the engine target output Per, followed by hunting of the engine speed ne.

The engine control according to the present embodiment controls the engine speed ne during relief to be equal to or higher than speed ne1. This prevents, at relief start time, the engine speed ne from being smaller than speed ne1 of the relief start time. During relief, if the engine speed ne is equal to or higher than speed ne1 of the relief start time, the operation oil discharged from the hydraulic pump 3 is discharged from the relief valve 16 and, therefore, the discharge pressure PRp hardly varies from the relief pressure. As a result, hunting of the engine speed ne is suppressed.

It is also possible to consider control which, during relief, increase the engine speed ne along the regulation line Lrl. Such control, if performed, increases fuel consumption of the engine 2. In the case of the engine control according to the present embodiment, the target speed n_com does not rise as long as the during-relief target speed n_comr does not become equal to or higher than the during-relief maximum target speed nrmax. Furthermore, even when the target speed n_com rises, the engine speed ne is determined based on the matching line Lmr. As a result, the engine control according to the present embodiment can suppress fuel consumption compared with control which increases the engine speed ne along the regulation line Lrl.

Although the present embodiment has been described above, the present embodiment is not limited by the above description. Furthermore, above-described components include what is easily conceivable by those skilled in the art, what is substantially identical, and what is within a so-called equivalent scope. It is also possible to combine the above-described components as needed. It is also possible to perform various omissions, substitutions, or modifications of the components without escaping from the gist of the present embodiment.

REFERENCE SIGNS LIST 1 construction machine
2 engine
2S output shaft
3 hydraulic pump
4 engine controller
5 pump control valve
6 controller
7, 8, 9 oil pressure sensor
10 PTO shaft
11 generator motor
12 storage battery
13 inverter
14 rotation sensor
15 voltage sensor
16 relief valve
17 operation oil tank
20 to 26 manipulation valve
21a to 26a pilot port
30 hydraulic actuator
31 boom cylinder
32 arm cylinder
33 bucket cylinder
34 swing motor
35, 36 travel motor
41, 42, 43, 44 manipulation lever
45, 46 sensor
60 pump requiring power calculation unit
61 pump driving power limit unit
61Fn function
66Fn table
62 relief determination unit
63 engine output control unit
64 minimum selection unit
65 addition unit
66 output conversion unit
Lep, Lep1 to Lep4 equal output line
Lmr matching line
Lrl regulation line
n_com target speed
n_comr during-relief target speed
nrmax during-relief maximum target speed
Per engine target output
Pl_ep load
Pp_limit pump driving power limit value
Pp_rq pump requiring power
PRp discharge pressure
PRr relief pressure

The invention claimed is:

1. An engine control apparatus for controlling an engine which drives a hydraulic pump to discharge operation oil, the engine control apparatus comprising:
a pump driving power limit unit configured to limit pump driving power, which is power used to drive the hydraulic pump, based on pressure of the operation oil discharged by the hydraulic pump when in a state in which a part of the operation oil discharged by the hydraulic pump is released because pressure of the operation oil discharged by the hydraulic pump has become equal to or higher than preset relief pressure; and
an engine output control unit configured to control output of the engine so that target speed, which is speed of the engine set as a target, becomes equal to or higher than a value at a point of time when limiting of the pump driving power is started.

2. The engine control apparatus according to claim 1, wherein the pump driving power limit unit is configured to acquire a pump driving power limit value as a limit value of the pump driving power so that the pump driving power falls as pressure of the operation oil discharged by the hydraulic pump rises.

3. The engine control apparatus according to claim 2, wherein the engine output control unit is configured to acquire the target speed from an equal output line of output of the engine set as a target acquired based on the pump driving power limit value acquired by the pump driving power limit unit and from a matching line acquired based on fuel consumption efficiency of the engine when the target speed increases above a maximum value after reaching the state in which a part of the operation oil discharged by the hydraulic pump is released.

4. A construction machine comprising:
an engine;
a hydraulic pump driven by the engine;
a relief valve configured to perform relief of operation oil when pressure of operation oil discharged by the hydraulic pump has become equal to or higher than preset relief pressure;
a hydraulic actuator supplied with the operation oil discharged from the hydraulic pump;
a working machine driven by the hydraulic actuator; and
the engine control apparatus for controlling the engine which drives the hydraulic pump to discharge operation oil, the engine control apparatus including:
a pump driving power limit unit configured to limit pump driving power, which is power used to drive the hydraulic pump, based on pressure of the operation oil discharged by the hydraulic pump when in a state in which a part of the operation oil discharged by the hydraulic pump is released because pressure of the operation oil discharged by the hydraulic pump has become equal to or higher than preset relief pressure; and
an engine output control unit configured to control output of the engine so that target speed, which is speed of the engine set as a target, becomes equal to or higher than a value at a point of time when limiting of the pump driving power is started.

5. The engine control apparatus according to claim 1, wherein while the pump driving power is being limited, the engine output control unit maintains the target speed to be equal to or greater than a speed at the point of time when limiting of the pump driving power is started.

6. The engine control apparatus according to claim 1, wherein a during-relief maximum target speed is equal to a during-relief target speed at a point in time when limiting of the pump driving power is started, and the engine output control unit is configured to control output of the engine so that the target speed is equal to or greater than the during-relief maximum target speed when the pump driving power is being limited.

7. The engine control apparatus according to claim 6, wherein, during a period when the pump driving power is being limited, the engine output control unit is configured to (1) set the target speed as the during-relief maximum target speed if the during-relief maximum target speed is greater than or equal to the during-relief target speed, and (2) set the target speed as the during-relief target speed if the during-relief maximum target speed is less than the during-relief target speed.

* * * * *